US012300139B1

(12) United States Patent
Hafiz et al.

(10) Patent No.: US 12,300,139 B1
(45) Date of Patent: May 13, 2025

(54) FOVEATED DRIVING FOR POWER SAVING

(71) Applicant: Apple Inc., Cupertino, CA (US)

(72) Inventors: Omar Hafiz, Sunnyvale, CA (US); Baris Cagdaser, Sunnyvale, CA (US); John T. Wetherell, San Jose, CA (US); Han Zhao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 18/328,196

(22) Filed: Jun. 2, 2023

Related U.S. Application Data

(62) Division of application No. 17/408,133, filed on Aug. 20, 2021, now Pat. No. 11,705,037.

(60) Provisional application No. 63/083,704, filed on Sep. 25, 2020.

(51) Int. Cl.
*G09G 3/20* (2006.01)

(52) U.S. Cl.
CPC ....... *G09G 3/20* (2013.01); *G09G 2320/0233* (2013.01); *G09G 2320/0626* (2013.01); *G09G 2330/021* (2013.01)

(58) Field of Classification Search
CPC ............. G09G 3/20; G09G 2320/0233; G09G 2320/0626; G09G 2330/021
See application file for complete search history.

(56) References Cited

U.S. PATENT DOCUMENTS 11,291,095 B1 * 3/2022 Chan ...................... H05B 45/39
11,996,032 B1 * 5/2024 Liu ...................... G09G 3/3275
2008/0024483 A1 * 1/2008 Ishii ................... G02B 26/0841 359/223.1
2011/0128277 A1 * 6/2011 Murakami ............ H03F 3/3022 327/518
2012/0049830 A1 * 3/2012 Watanabe ............. H02M 3/158 323/293
2012/0081347 A1 * 4/2012 Kim ..................... G09G 3/3648 345/211
2016/0260374 A1 * 9/2016 Inoue ................... G09G 3/3696
2018/0075798 A1 3/2018 Nho et al.
2018/0075811 A1 3/2018 Wacyk et al.
2018/0182329 A1 * 6/2018 Yu ........................ G09G 3/3614
2019/0237021 A1 * 8/2019 Peng ...................... G09G 5/003
2019/0287450 A1 9/2019 Urabe et al.
2020/0111422 A1 4/2020 Park et al.
(Continued)

*Primary Examiner* — Sejoon Ahn
(74) *Attorney, Agent, or Firm* — Fletcher Yoder, P.C.

(57) ABSTRACT

In an embodiment, an electronic display includes an active area including a plurality of pixels arranged in columns and a plurality of source drivers driving image data to columns of pixels. The electronic display also includes a first plurality of switches selectively coupling respective source drivers of the plurality of source drivers to one or more columns. Selective coupling enables the respective source drivers to, at different times, drive the image data to: a single column; and multiple columns. In another embodiment, an electronic display includes a display panel configured to operate using a reference voltage received via a resistive path having a routing resistance, a reference voltage source outputting the reference voltage, and a feedback circuit sensing an electrical parameter of the resistive path and producing a compensation voltage that, when added to the reference voltage, causes the reference voltage to remain substantially constant at the display panel.

20 Claims, 13 Drawing Sheets

(56) References Cited

U.S. PATENT DOCUMENTS

2020/0357875 A1* 11/2020 Wang .................. H10K 59/131
2021/0142704 A1* 5/2021 Kim ...................... G09G 3/006

* cited by examiner

FOVEATED DRIVING FOR POWER SAVING

CROSS-REFERENCE TO RELATED APPLICATIONS

This application is a divisional of U.S. patent application Ser. No. 17/408,133, entitled "FOVEATED DRIVING FOR POWER SAVING," filed Aug. 20, 2021, which is a non-provisional application claiming priority to U.S. Provisional Application No. 63/083,704, entitled "FOVEATED DRIVING FOR POWER SAVING," filed Sep. 25, 2020, each of which are hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to power saving techniques that can be used with foveated content, such as dynamically foveated content. Foveation refers to a technique in which some aspect of an image (e.g., an amount of detail, image quality, coloration, or brightness) is varied across displayed content based at least in part on a fixation point, such as a point or area within the content itself, a point or region of the content on which one or more eyes of a user are focused, or movement of the one or more eyes of the user. For example, the brightness level in various portions of the image can be varied depending on the fixation point. Indeed, in regions of the electronic display some distance beyond the fixation point, which are more likely to appear in a person's peripheral vision, the brightness may be lowered. In this way, foveation can reduce an amount of power used to display the content on the electronic display without being noticeable to the person viewing the electronic display.

In static foveation, various areas of an electronic display having different brightness levels each have a fixed size and location on the electronic display for each frame of content displayed to the user. In dynamic foveation, the various areas at different brightness levels may change between two or more images based at least in part on the gaze of the viewer. For example, as the eyes of the user move across the electronic display from a top left corner to a bottom right corner, the high brightness level portion of the electronic display also moves from the top left corner to the bottom right corner of the display. For content that uses multiple images, such as videos and video games, the content may be presented to the viewer by displaying the images in rapid succession. The high brightness and lower brightness portions of the electronic display in which the content is displayed may change between frames.

For dynamic foveation, an eye tracking system is used to determine a focal point of the eyes of the user on the electronic display. That is, a continuous input from the eye tracking system is provided to a foveation system and used to determine the size and location of the high brightness level area on the electronic display. If the eye tracking system detects movement of the gaze of the user, the foveation system may cause display artifacts to be visible or perceived by the user which negatively affect the experience of the user. The artifacts may include low luminance levels at the focal point of the eyes of the user, intermittent switching between high luminance levels and low luminance levels due to sudden movement of the foveated areas of the display, and flashing resulting from sudden luminance level changes at various areas of the display. Foveation errors (e.g., temporal flashing) on the electronic display may be visible to the user and may deteriorate the experience of the user looking at the electronic display.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
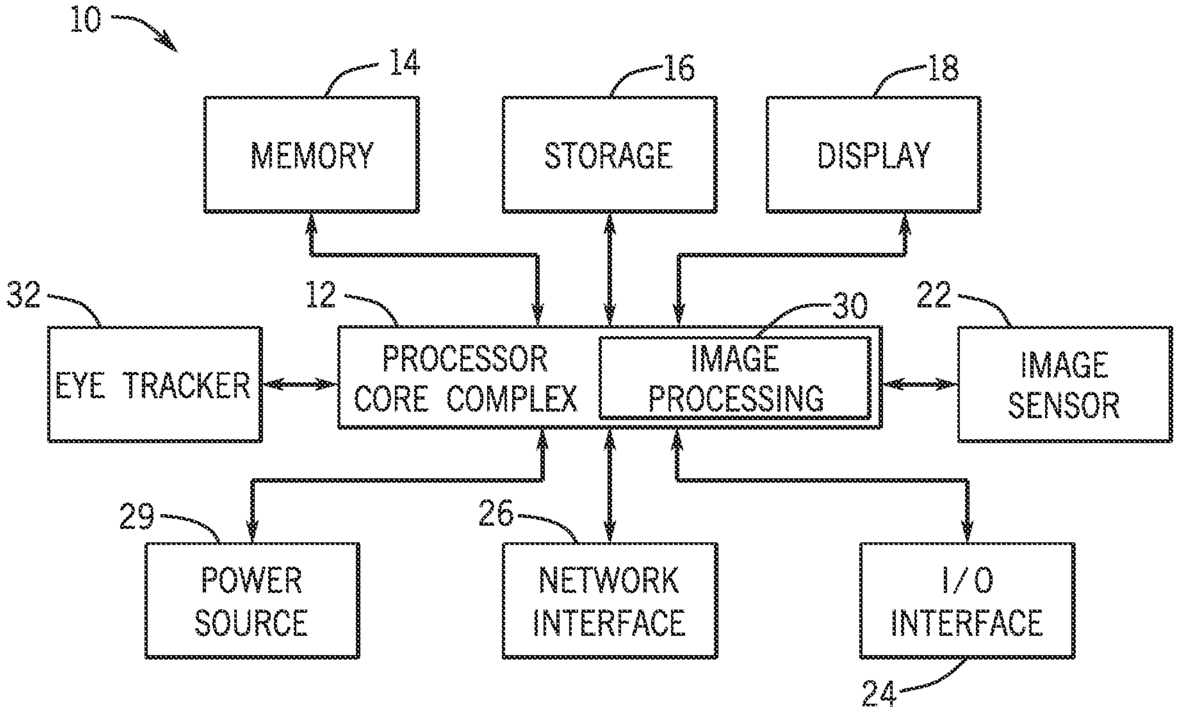
FIG. 1 is a block diagram of an electronic device with an electronic display, according to an embodiment.
Figure 2:
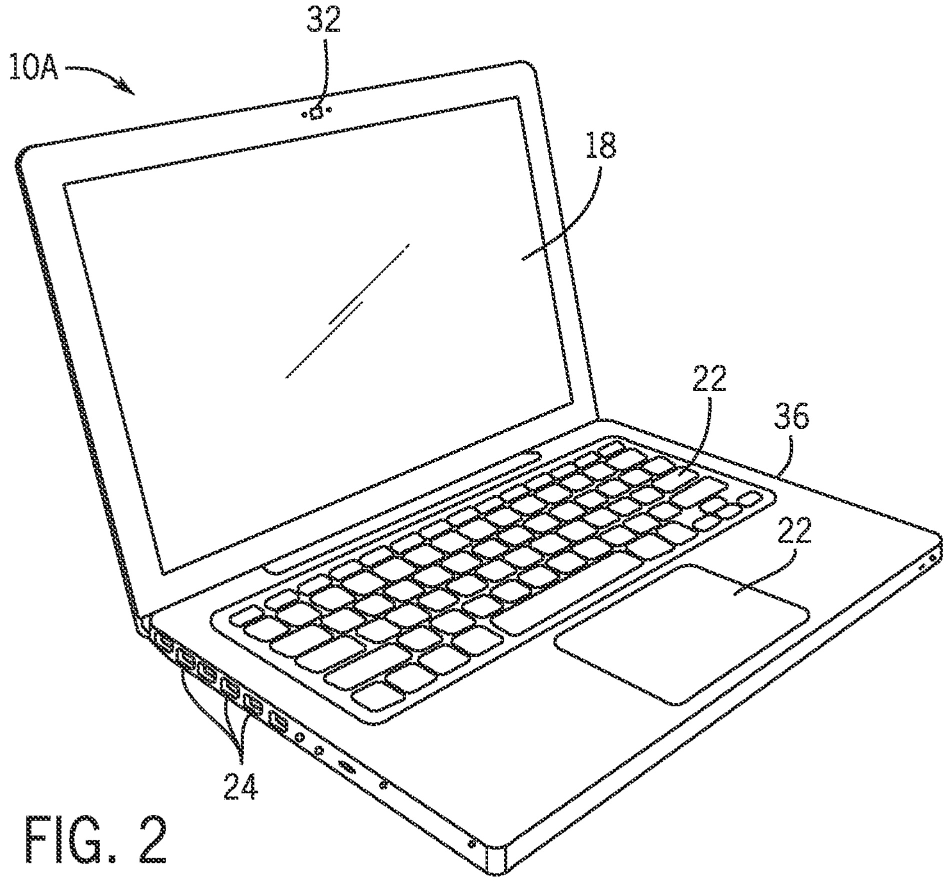
FIG. 2 is a perspective view of a notebook computer representing an embodiment of the electronic device of FIG. 1.
Figure 4:
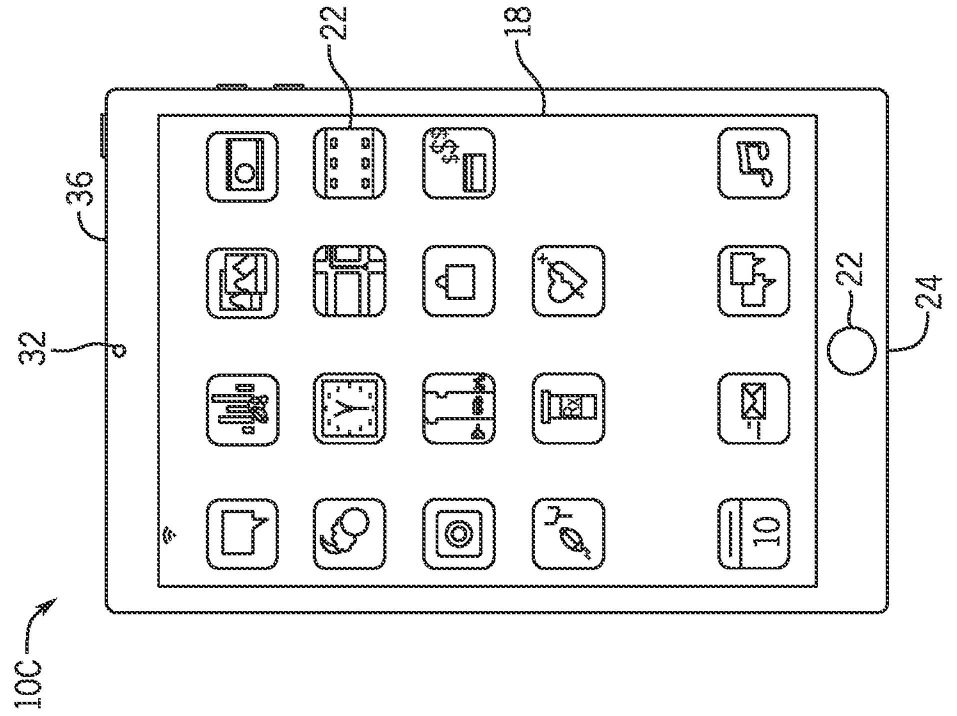
FIG. 4 is a front view of another hand-held device representing another embodiment of the electronic device of FIG. 1.
Figure 3:
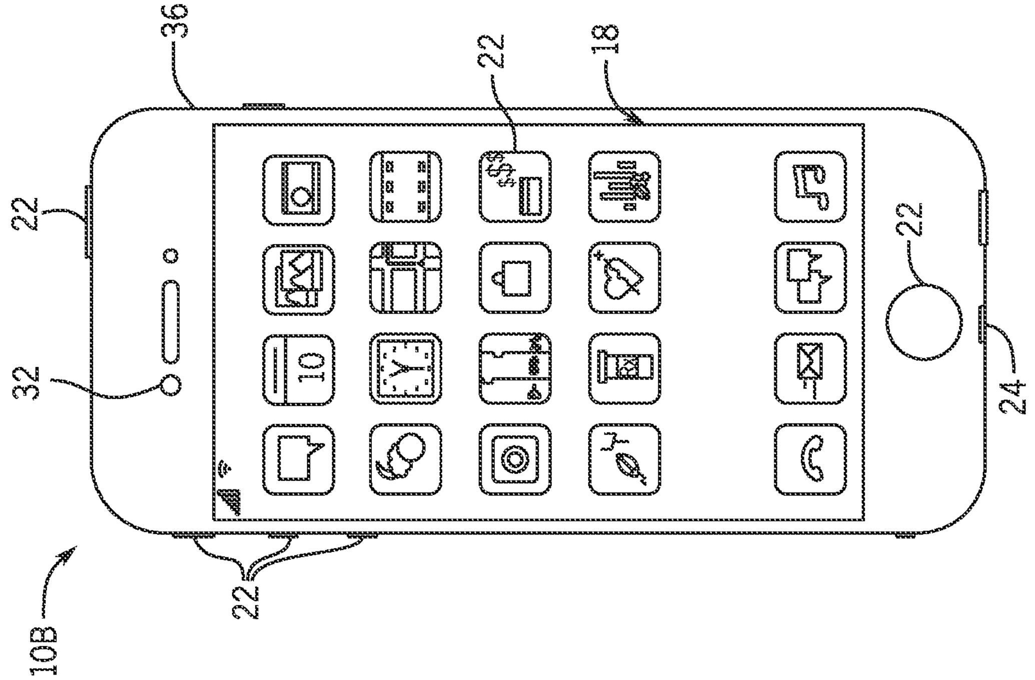
FIG. 3 is a front view of a hand-held device representing another embodiment of the electronic device of FIG. 1.
Figure 5:
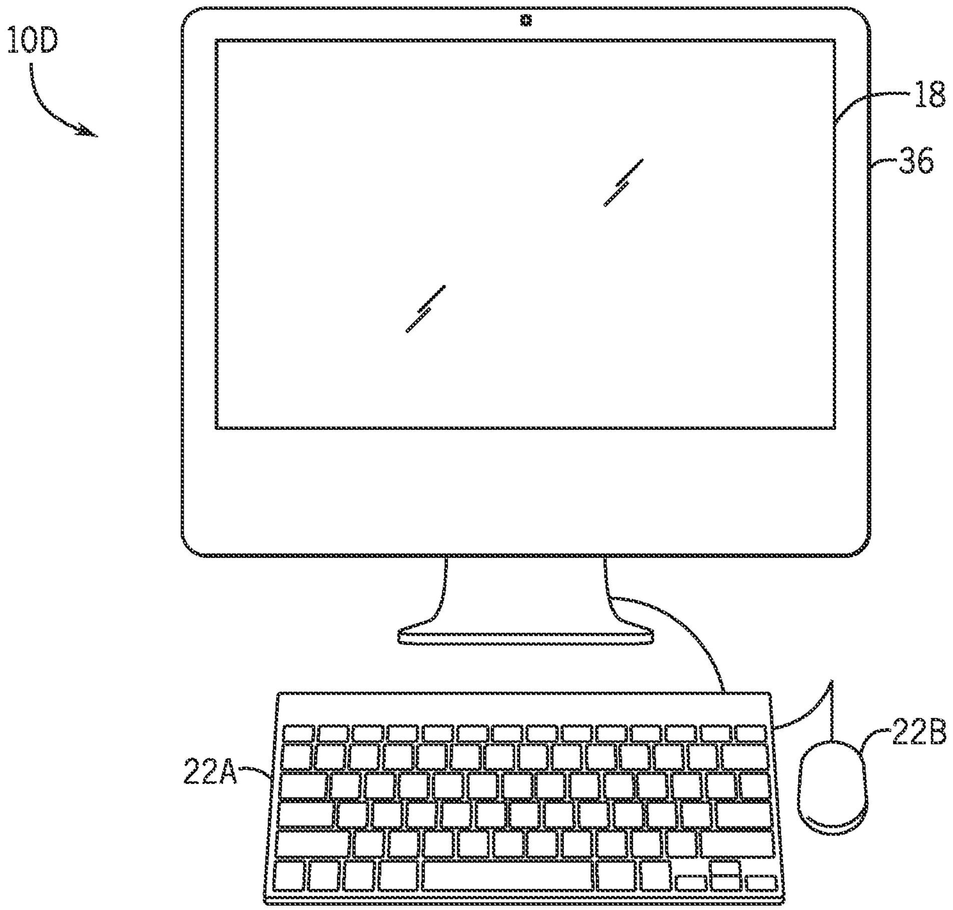
FIG. 5 is a front view of a desktop computer representing another embodiment of the electronic device of FIG. 1.
Figure 6:
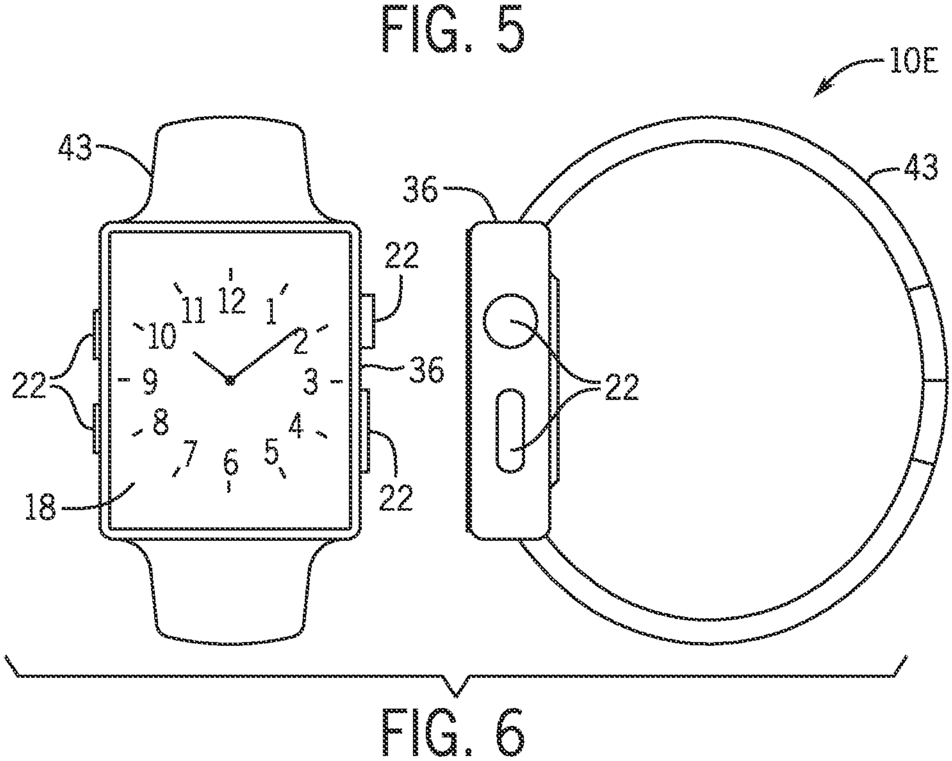
FIG. 6 is a perspective view of a wearable electronic device representing another embodiment of the electronic device of FIG. 1.

FIG. 1 illustrates a block diagram of an electronic device 10 that may provide power saving techniques for a foveated display. As described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device with a display.

The electronic device 10 shown in FIG. 1 may include, for example, a processor core complex 12, a memory 14, a storage device 16, an electronic display 18, input structures 22, an input/output (I/O) interface 24, a network interface 26, a power source 29, and an eye tracker 32. The electronic device 10 may include image processing circuitry 30. The image processing circuitry 30 may prepare image data (e.g., pixel data) from the processor core complex 12 for display on the electronic display 18.

Although the image processing circuitry 30 is shown as a component within the processor core complex 12, the image processing circuitry 30 may represent any suitable hardware and/or software that may occur between the initial creation of the image data and its preparation for display on the electronic display 18. Thus, the image processing circuitry 30 may be located wholly or partly in the processor core complex 12, wholly or partly as a separate component between the processor core complex 12 and the electronic display 18, or wholly or partly as a component of the electronic display 18.

The various components of the electronic device 10 may include hardware elements (including circuitry), software elements (including machine-executable instructions stored on a tangible, non-transitory medium, such as the local memory 14 or the storage device 16, or a combination of both hardware and software elements. It should be noted that FIG. 1 is merely one example of a particular implementation and is intended to illustrate the types of components that may be present in the electronic device 10. Indeed, the various components illustrated in FIG. 1 may be combined into fewer components or separated into additional components. For instance, the local memory 14 and the storage device 16 may be included in a single component.

The processor core complex 12 may perform a variety of operations of the electronic device 10, such as generating image data to be displayed on the electronic display 18 and performing dynamic foveation of the content to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application) stored on a suitable storage apparatus, such as the local memory 14 and/or the storage device 16.

The memory 14 and the storage device 16 may also store data to be processed by the processor core complex 12. That is, the memory 14 and/or the storage device 16 may include random access memory (RAM), read only memory (ROM), rewritable non-volatile memory such as flash memory, hard drives, optical discs, or the like.

The electronic display 18 may be a self-emissive display, such as an organic light emitting diode (OLED) display, an LED display, or μLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show foveated content.

The electronic display 18 may display various types of content. For example, the content may include a graphical user interface (GUI) for an operating system or an application interface, still images, video, or any combination thereof. The processor core complex 12 may supply or modify at least some of the content to be displayed. The input structures 22 of the electronic device 10 may enable a user to interact with the electronic device 10 (e.g., pressing a button or icon to increase or decrease a volume level). The I/O interface 24 and the network interface 26 may enable the electronic device 10 to interface with various other electronic devices. The power source 29 may include any suitable source of power, such as a rechargeable lithium polymer (Li-poly) battery and/or an alternating current (AC) power converter.

The network interface 26 may include, for example, interfaces for a personal area network (PAN), such as a Bluetooth network, a local area network (LAN) or wireless local area network (WLAN), such as an 802.11x Wi-Fi network, and/or a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

The eye tracker 32 may measure positions and movement of one or both eyes of a person viewing the electronic display 18 of the electronic device 10. For instance, the eye tracker 32 may be a camera that records the movement of a viewer's eye(s) as the viewer looks at the electronic display 18. However, several different practices may be employed to track a viewer's eye movements. For example, different types of infrared/near infrared eye tracking techniques such as bright-pupil tracking and dark-pupil tracking may be used. In these types of eye tracking, infrared or near infrared light is reflected off of one or both of the eyes of the viewer to create corneal reflections.

A vector between the center of the pupil of the eye and the corneal reflections may be used to determine a point on the electronic display 18 at which the viewer is looking. Moreover, as discussed below, varying portions of the electronic display 18 may be used to show content in relatively higher and lower luminance level portions based at least in part on the point of the electronic display 18 at which the viewer is looking.

As will be described in more detail herein, the image processing circuitry 30 may perform particular image processing adjustments to counteract artifacts that may be observed when the eye tracker 32 tracks eye movement during foveation. For example, foveated areas rendered on the electronic display 18 may be dynamically adjusted (e.g., by size and/or position).

As discussed above, the electronic device 10 may be a computer, a portable electronic device, a wearable electronic device, or other type of electronic device. Example computers may include generally portable computers (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California.

By way of example, the electronic device 10 depicted in FIG. 2 is a notebook computer 10A, in accordance with one embodiment of the present disclosure. The computer 10A includes a housing or enclosure 36, an electronic display 18, input structures 22, and ports of an I/O interface, such as the I/O interface 24 discussed with respect to FIG. 1. In one embodiment, a user of the computer 10A may use the input structures 22 (such as a keyboard and/or touchpad) to interact with the computer 10A, such as to start, control, or operate a GUI or applications running on the computer 10A. For example, a keyboard and/or touchpad may allow the user to navigate a user interface or application interface displayed on the electronic display 18. Additionally, the computer 10A may include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B includes an enclosure 36 to protect interior components from physical damage and to shield the interior components from electromagnetic interference. The enclosure 36 may surround the electronic display 18. The I/O interfaces 24 may be formed through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

The user input structures 22, in combination with the electronic display 18, may allow a user to control the handheld device 10B. For example, the input structures 22 may activate or deactivate the handheld device 10B, navigate a user interface to a home screen or a user-configurable application screen, and/or activate a voice-recognition feature of the handheld device 10B. Other input structures 22 may provide volume control, or toggle between vibrate and ring modes. The input structures 22 may also include a microphone to obtain a voice of the user for various voice-related features, and a speaker to enable audio playback and/or certain capabilities of the handheld device 10B. The input structures 22 may also include a headphone input to provide a connection to external speakers and/or headphones.

FIG. 4 depicts a front view of another handheld device 10C, which represents another embodiment of the electronic device 10 discussed with respect to FIG. 1. The handheld device 10C may represent, for example, a tablet computer or portable computing device. By way of example, the handheld device 10C may be a tablet-sized embodiment of the electronic device 10, which may be, for example, a model of an iPad® available from Apple Inc. The various components of the handheld device 10C may be similar to the components of the handheld device 10B discussed with respect to the FIG. 3. The handheld device 10C may include an eye tracker 32.

FIG. 5 depicts a computer 10D which represents another embodiment of the electronic device 10 discussed with respect to FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. The enclosure 36 of the computer 10D may be provided to protect and enclose internal components of the computer 10D, such as the electronic display 18. In certain embodiments, a user of the computer 10D may interact with the computer 10D using various peripheral input devices, such as input structures 22A and 22B (e.g., keyboard and mouse), which may connect to the computer 10D. Furthermore, the computer 10D may include an eye tracker 32.

FIG. 6 depicts a wearable electronic device 10E representing another embodiment of the electronic device 10 discussed with respect to FIG. 1. The wearable electronic device 10E is configured to operate using techniques described herein. By way of example, the wearable electronic device 10E may be virtual reality glasses. Additionally or alternatively, the wearable electronic device 10E may be or include other wearable electronic devices such as augmented reality glasses.

The electronic display 18 of the wearable electronic device 10E may be visible to a user when the electronic device 10E is worn by the user. Additionally, while the user is wearing the wearable electronic device 10E, an eye tracker (not shown) of the wearable electronic device 10E may track the movement of one or both of the eyes of the user. In some instances, the handheld device 10B discussed with respect to FIG. 3 may be used in the wearable electronic device 10E. For example, a portion 37 of a headset 38 of the wearable electronic device 10E may allow a user to secure the handheld device 10B therein and use the handheld device 10B to view virtual reality content.

The electronic display 18 of the electronic device 10 may show images or frames of content such as photographs, videos, and video games in a foveated manner. Foveation refers to a technique in which an amount of detail, resolution, image quality, or brightness is varied across an image based at least in part on a fixation point, such as a point or area within the image itself, a point or region of the image on which a viewer's eyes are focused, or based at least in part on the gaze movement of the viewer's eyes. More specifically, the brightness can be varied by using different luminance levels in various portions of an image. For instance, in a first portion of the electronic display 18, one luminance level may be used to display one portion of an image, while a lower or higher luminance level may be used for a second portion of the image on the electronic display 18. The second portion of the electronic display 18 may be in a different area of the display 18 than the first area or may be located within the first area.

In some embodiments, the change in brightness or luminance level may be a gradual (i.e., smooth) transition from a central portion having a high luminance level to a peripheral edge of the foveated area. That is, for example, the luminance level of the foveated region may have a central portion with a high luminance. A luminance level of an outer portion of the foveated region may gradually decrease from an edge of the central region to an edge of the outer portion.

Figure 7:
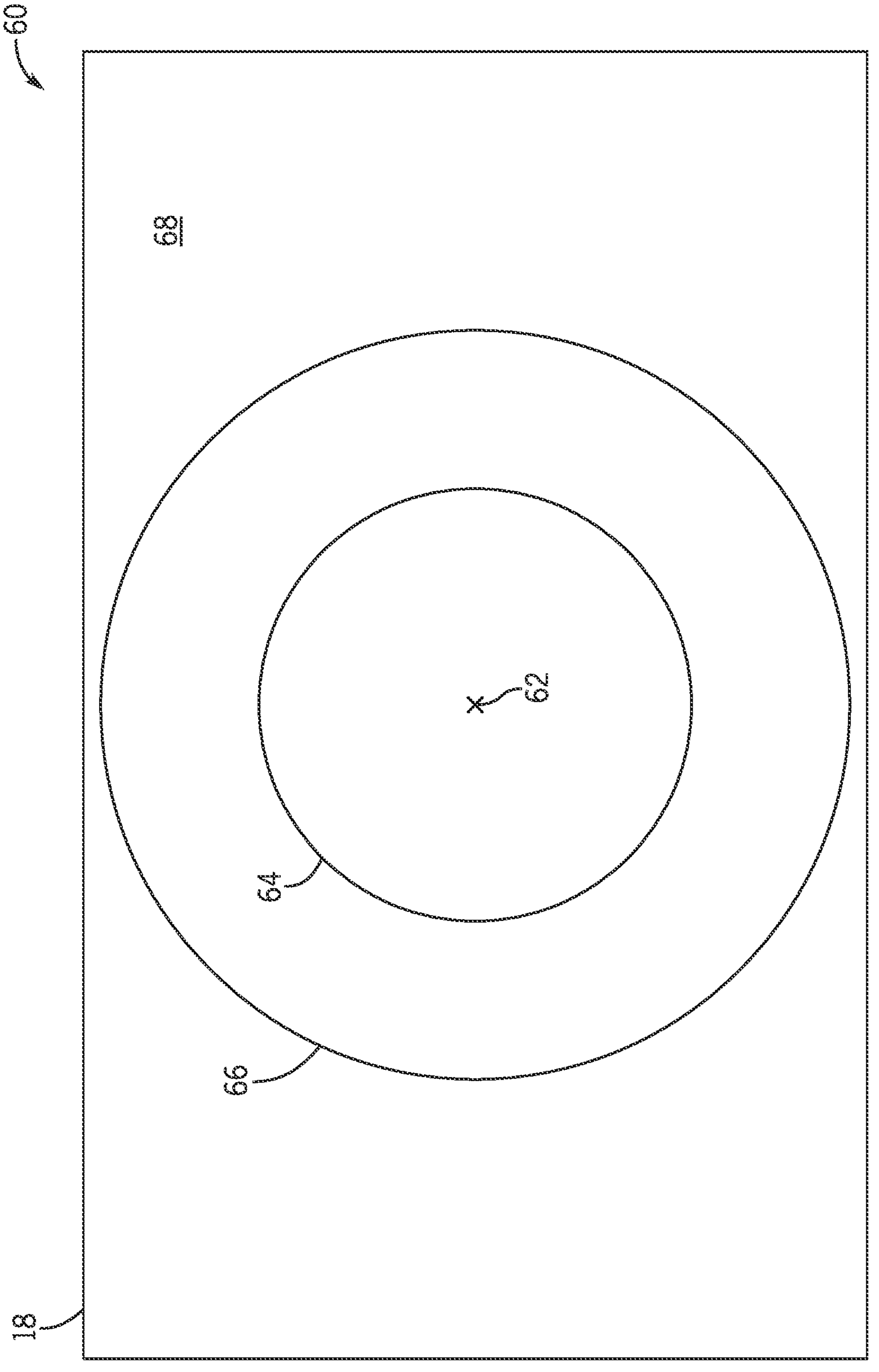
FIG. 7 is a diagram of the display of FIG. 1 using static foveation, according to an embodiment.

FIG. 7 is a diagram 60 representative of the electronic display 18 using static foveation. In static foveation, a size and/or a location of the various resolution areas of the electronic display 18 may be fixed. As shown, the electronic display 18 includes a higher luminance level area 64, a medium luminance level area 66, and a lower luminance level area 68 fixed about a centerpoint 62 of the display 18. Application of the foveation techniques described herein may adjust (e.g., increase and/or decrease) one or more luminance levels of one or more areas of the display 18 relative to a defined luminance level associated with the respective area of the display 18. A defined luminance level associated with each of the areas 64, 66, 68 may be a luminance level associated with image content before application of foveation techniques. In one particular example, the defined luminance level of the areas 64, 66, and 68 may be a maximum luminance of the display (e.g., all white pixels at maximum brightness) if foveation were not used. With foveation, the adjusted luminance of the area 64 may be 100 percent of defined luminance level, the adjusted luminance of the area 66 may be eighty percent of the defined luminance level, and the luminance level of the area 68 may be sixty percent of the defined luminance level of the display 18.

To reiterate, the adjusted luminance levels of the areas 64, 66, and 68 are relative to the defined luminance levels of the areas 64, 66, and 68, respectively. The defined luminance thus may change depending on the content of the image data. The medium luminance level area 66 may have a lower luminance level than a defined luminance level of the same area. Similarly, the luminance level of the lower luminance level area 68 may be lower than the defined luminance level of the same area. Finally, the luminance level of the higher luminance level area 64 may be the same, lower, or even higher than the defined luminance level of the same area. In certain embodiments, the adjusted luminance level of an area further from the centerpoint 62 may be adjusted more (e.g., further reduced) than an adjusted luminance level of an area closer to the centerpoint 62. Additionally or alternatively, the adjusted luminance level of an area further from the centerpoint 62 may be adjusted less (e.g., reduced to a lesser extent) than an adjusted luminance level of an area closer to the centerpoint 62.

As one example, an adjusted luminance level of the lower luminance level area 68 may be between forty to sixty percent of a defined luminance level of an original image brightness associated with the area 68. That is, the adjusted luminance level may be between forty to sixty percent of the defined luminance level (e.g., sixty percent of the maximum luminance level) of the display, as described in the example above. An adjusted luminance level of the medium luminance level area 66 may be between sixty to eighty percent of a defined luminance level of an original image brightness associated with the area 66 and a luminance level of the higher luminance level area 64 may be between eighty to one hundred percent of a defined luminance level of an original image brightness associated with the area 64. As illustrated in FIG. 7, three areas 64, 66, 68 may be formed from concentric circles about the centerpoint 62. While three areas are illustrated in FIG. 7, it should be understood that there may be two or more areas (e.g., a higher luminance level area and a lower luminance level area) of the electronic display 18. Moreover, in some examples, the luminance may be adjusted according to any suitable function that reduces the brightness of image data based at least in part on the distance of image pixels from the centerpoint 62.

As described above, electronic displays such as the electronic display 18 may also use dynamic foveation. In dynamic foveation, the areas of the electronic display 18 at which the various luminance levels are used may change between two or more images based at least in part on the focal point of the eyes of the user. As an example, content that uses multiple images, such as videos and video games, may be presented to viewers by displaying the images in rapid succession. The portions of the electronic display 18 in which the content is displayed with a relatively high luminance level and a relatively low luminance level may change, for instance, based at least in part on data collected by the eye tracker 32 which indicates a focal point on the electronic display 18 of the eyes of the user.

Figure 8:
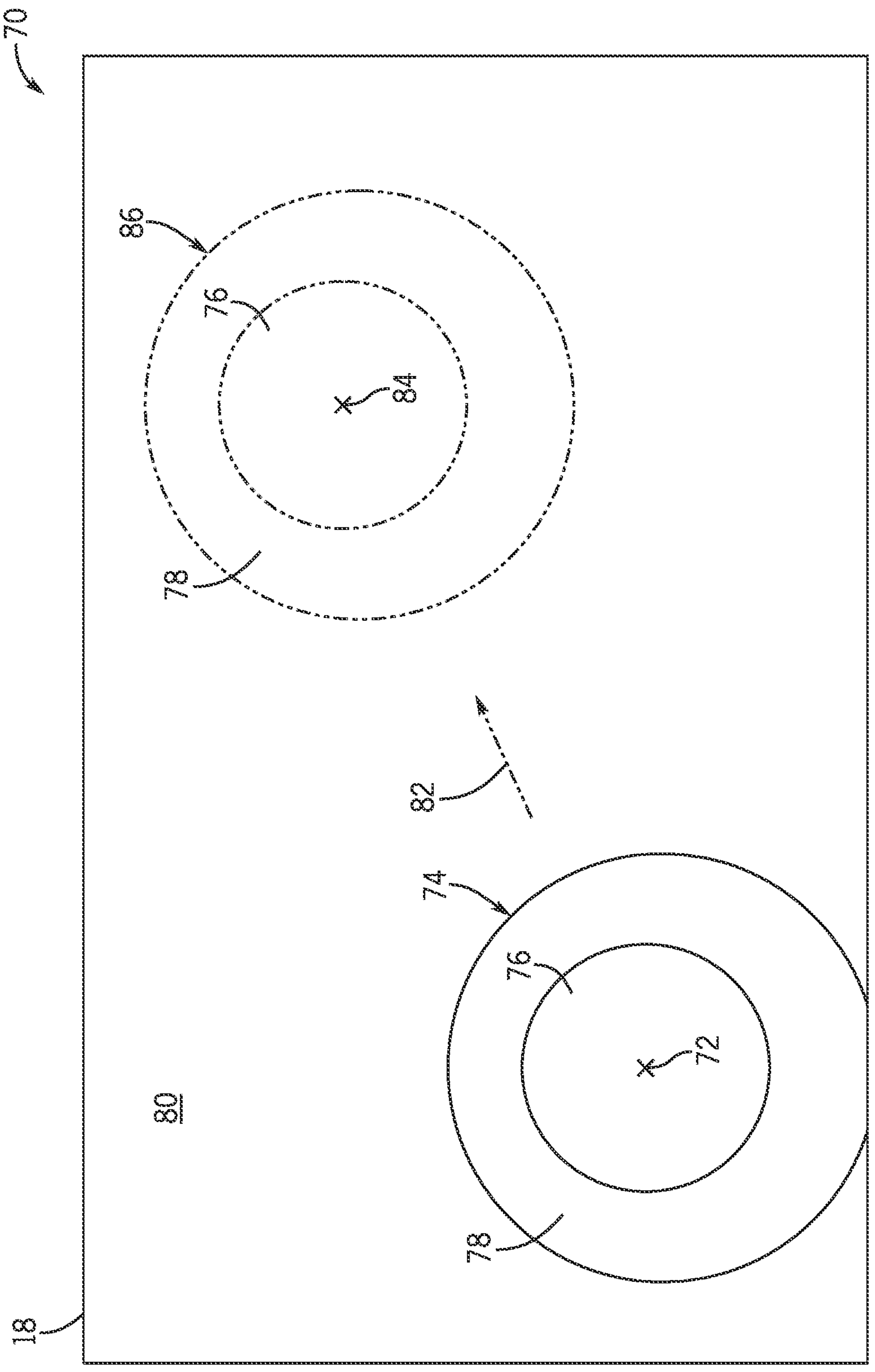
FIG. 8 is a diagram of the display of FIG. 1 using dynamic foveation, according to an embodiment.

FIG. 8 is a diagram 70 that illustrates the electronic display 18 using dynamic foveation. The diagram 70 includes a first frame 74 and a second frame 86 each having a higher luminance level area 76, a medium luminance level area 78, and a lower luminance level area 80. The first frame 74 and the second frame 86 each may represent a different portion of a single content frame (e.g., a different portion of a single image) or each may represent a different content frame of consecutive content frames (e.g., content frames of a video). In some instances, transitional frames between these frames provide a smooth movement of the frames 74 and 86 corresponding to tracked movement 82 of the eyes of the user from a first location 72 associated with the first frame 74 and a second location 84 associated with the second frame 86. The higher luminance level area 76, the medium luminance level area 78, and the lower luminance level area 80 each may correspond to the higher luminance level area 64, the medium luminance level area 66, and the lower luminance level area 68 discussed with respect to FIG. 7.

The frames 74 and 86 are in different locations on the electronic display 18 based at least in part on a focal point of the eyes of the user. During a transition from the first frame 74 to the second frame 86 (or when the focal point of the eyes of the user move from the first location 72 of the first frame 74 to the second location 84 of the second frame 86), the higher luminance level area 76 and medium luminance level area 78 are moved from near a bottom left corner of the electronic display 18 to a top right corner of the electronic display 18.

Figure 9:
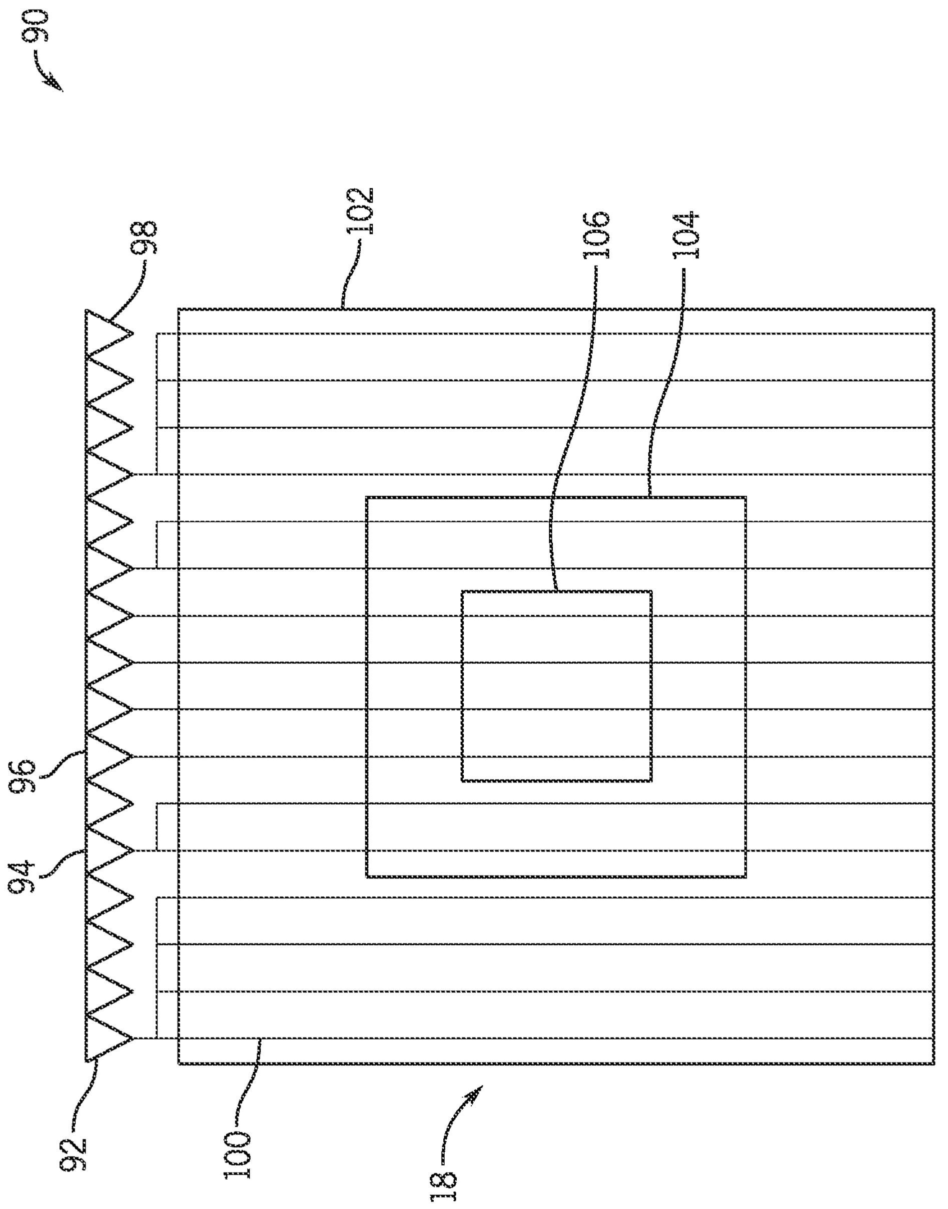
FIG. 9 is a diagram of the display of FIG. 1 including foveated source drivers, according to an embodiment.

A foveation system may reduce power and increase power savings by turning off circuit components of a display panel in one or more foveated areas. For example, a foveation system may receive an indication of a gaze from a gaze tracker and may determine corresponding portions of an electronic display which may be operated by a reduced number of circuit components. FIG. 9 is a diagram 90 that illustrates the electronic display 18 using foveation techniques. The electronic display 18 may include a display panel having multiple display pixels arranged as an array or matrix defining multiple rows and columns. The electronic display 18 may include a low luminance level area 102, a medium luminance level area 104, and a high luminance level area 106. The electronic display 18 may include any number of source drivers that may receive image data that indicates desired luminance of one or more display pixels for displaying an image frame, analyze the image data to determine timing data based at least in part on what display pixels the image data corresponds to, and transmit the timing data to a gate driver. Based at least in part on the timing data, the gate driver may then transmit gate activation signals to activate a row of display pixels.

When activated, luminance of a display pixel may be adjusted by amplified image data received via data lines 100. The source drivers may generate amplified image data by receiving the image data and amplifying voltage of the image data. The source drivers may then supply the amplified image data to the activated pixels. Based on received amplified image data, the display pixels may adjust a corresponding luminance using electrical power supplied from the power source 29. In some embodiments, the electronic display 18 includes a first source driver amplifier 92, a second source driver amplifier 94, a third source driver amplifier 96, and any number of inactive source driver amplifiers 98. The first source driver amplifier 92 may be associated with any number of rows and/or columns of pixels in the low luminance level area 102. The foveation system may receive an indication of a gaze from a gaze tracker and determine area 102 corresponds to a low luminance level area 102. As a result, the foveation system may turn off any number of source driver amplifiers 98 associated with the low luminance level area 102 and may connect the first source driver amplifier 92 to data lines previously supplied image data by the now inactive source driver amplifiers 98. For example, the first source driver amplifier 92 may be connected to four data lines 100 and may supply amplified image data to display pixels associated with the four data lines 100.

The second source driver amplifier 94 may be associated with any number of rows and/or columns of pixels in the medium luminance level area 104. The foveation system may receive an indication of a gaze from a gaze tracker and determine area 104 corresponds to a medium luminance level area 104. As a result, the foveation system may turn off any number of source driver amplifiers 98 associated with the medium luminance level area 104 and may connect the second source driver amplifier 94 to data lines previously supplied image data by the now inactive source driver amplifiers 98. For example, the second source driver amplifier 94 may be connected to two data lines 100 and may supply amplified image data to display pixels associated with the two data lines 100. The third source driver amplifier 96 may be connected to a single row and/or column of pixels in the high luminance level area 106. The foveation system may receive an indication of a gaze from a gaze tracker and determine area 106 corresponds to a high luminance level area 106. As a result, the foveation system may leave on all source driver amplifiers in the high luminance level area 106. For example, the third source driver amplifier 96 may be connected to a single data line 100 and may supply amplified image data to display pixels associated with the single data line 100. While the source driver amplifiers in FIG. 9 illustrate connections to one, two, or four data lines, any number of data lines may be connected a source driver amplifier according to the foveated area associated with the source driver amplifier and the data lines.

A foveation system may receive an indication of movement associated with a gaze from a gaze tracker and may adjust one or more foveated areas, as described above. If the eye tracking system detects movement of the gaze of the user, the foveation system may cause display artifacts to be visible or perceived by the user which negatively affect the experience of the user. The artifacts may include low luminance levels at the focal point of the eyes of the user, intermittent switching between high luminance levels and low luminance levels due to sudden movement of the foveated areas of the display, and flashing resulting from sudden luminance level changes at various areas of the display. To prevent artifacts levels from being visible and deteriorating an experience of the user, techniques described herein provide compensation to image data.

Figure 10:
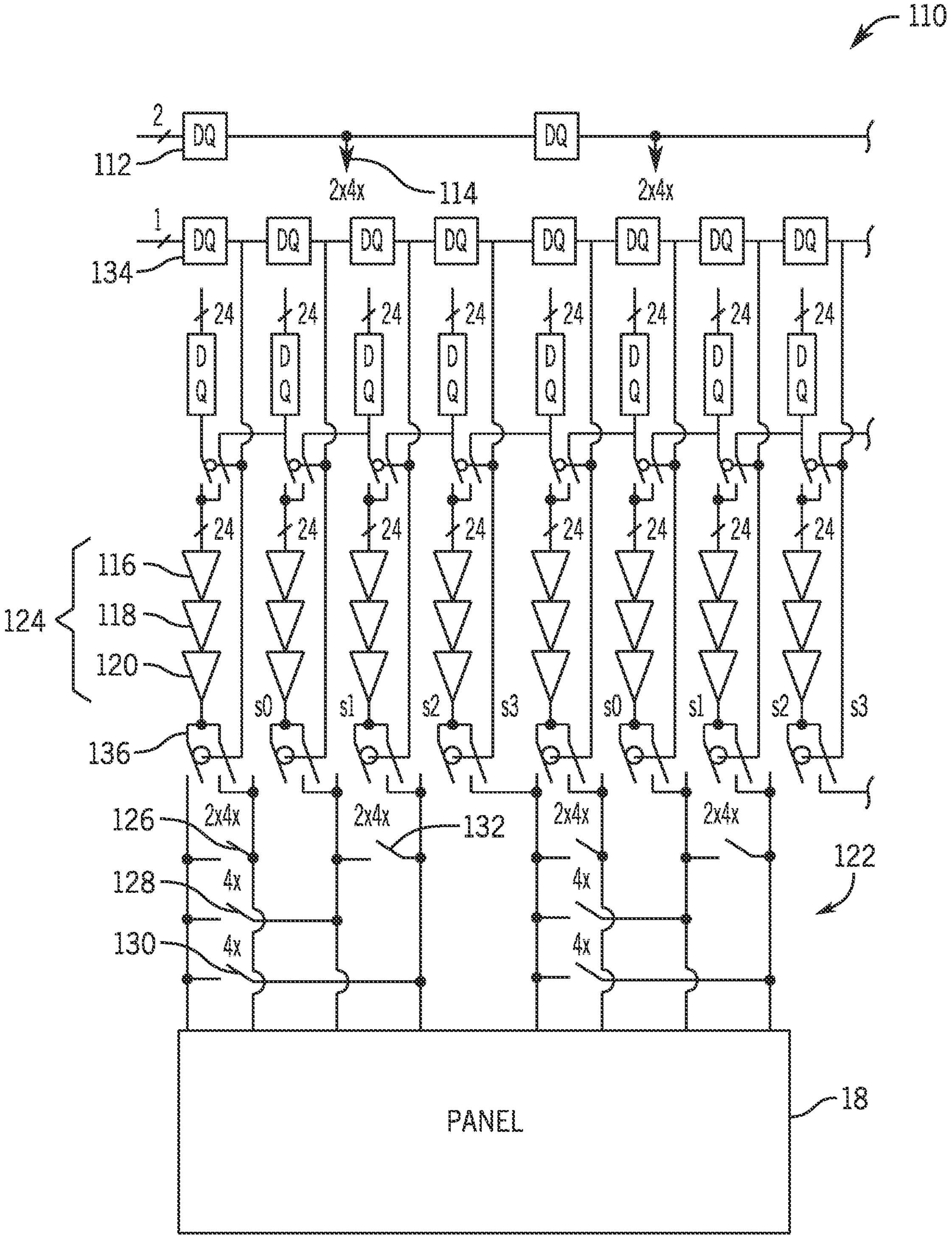
FIG. 10 is a schematic diagram of circuit components for a foveated display, according to an embodiment.

FIG. 10 illustrates a schematic diagram 110 of circuit components for a foveated display, according to an embodiment of the present disclosure. The schematic diagram 110 may include any number of source drivers 124 and each source driver may include a red component 116, a blue component 118, and a green component 120. A first flip flop 112 controls operation of a set of switches 122 (e.g., switches 126, 128, 130, 132) to determine one or more source drivers to supply power to one or more rows of pixels in an electronic display 18. For example, the first flip flop 112 may supply a control signal 114 based on a logic table, such as Table 1 below:

TABLE 1

| Bit String | Source Driver Mode |
|---|---|
| 00 | n/a |
| 01 | 1x |
| 10 | 2x |
| 11 | 4x |

The control signal 114 may be a bit string for determining an operational mode for any number of source drivers. For example, in a 01 bit string of the control signal 114, the first switch 126 may close which connects two rows of pixels of the display 18 to a single source driver, such as source driver 124, as described above with respect to FIG. 9. As another example, a 11 bit string of the control signal 114 may close switches 126, 128, and 130 to connect four rows of pixels of the display panel to the source driver 124. While the above discussion refers to the source driver 124, any suitable switches may be opened or closed to connect any number of source drivers to any number of rows of pixels of the display 18. A second flip flop 134 may control the operation of a second set of switches, such as switch 136 that determine which source driver(s) to connect to the display 18. For example, the second flip flop 134 may supply a control signal to operate the switch 136 and connect the source driver 124 to the display 18.

Figure 11:
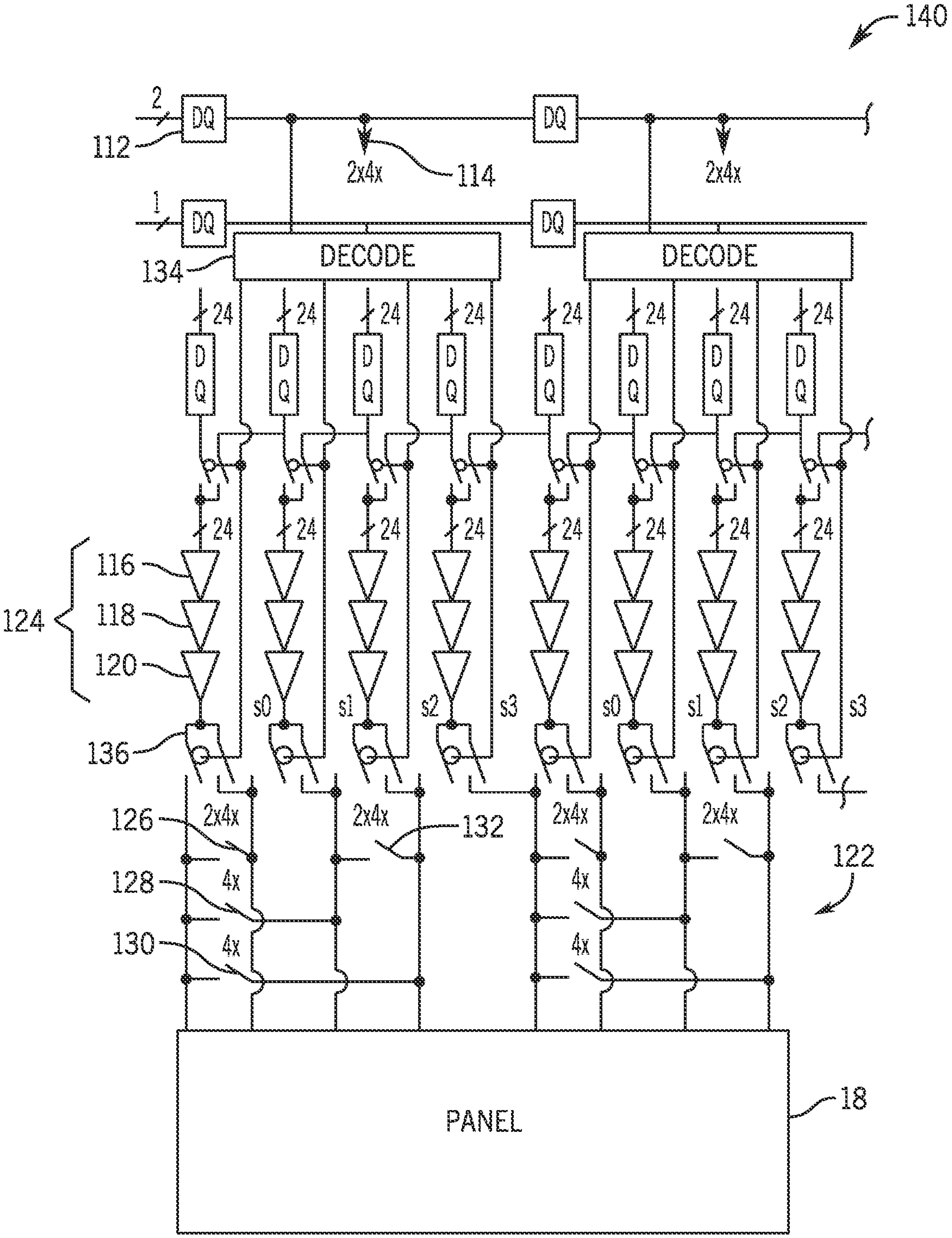
FIG. 11 is a schematic diagram of circuit components including a decode block for a foveated display, according to an embodiment.

FIG. 11 illustrates a schematic diagram 140 of circuit components for a foveated display, according to an embodiment of the present disclosure. A decode block 142 may supply a control signal to control operation of a set of switches, such as switch 136 that determine which source driver(s) to connect to the display 18. For example, the set of switches may couple any subset (e.g., 1, 2, all) of the source drivers to the display 18. The decode block 142 may decode image data in any suitable way. For example, the decode block 142 may supply a control signal to operate the switch 136 and connect the source driver 124 to the display 18. The first flip flop 112 may supply a control signal 114 based on a logic table, such as Table 2 below:

TABLE 2

| Bit String | Source Driver Mode |
|---|---|
| 00 | 1x |
| 01 | 1x |
| 10 | 2x |
| 11 | 4x |

In certain embodiments, the decode block 142 may receive the control signal 114 and may control operation of the set of switches to determine which source driver(s) to connect to the display 18 based on the control signal 114. For example, the decode block 142 may determine at least one of the source drivers is defective (e.g., inoperative) and may bypass the defective source driver.

Figure 12:
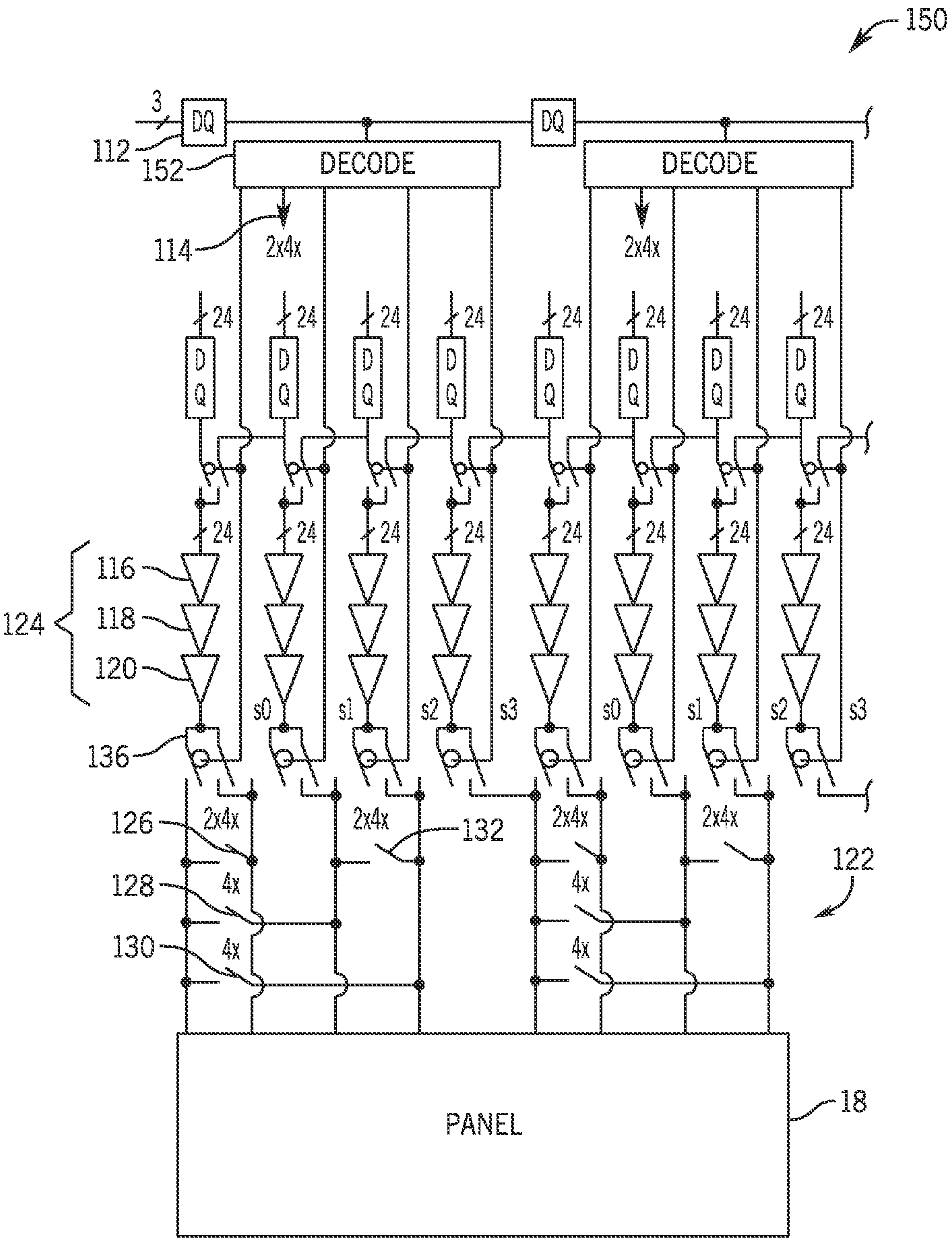
FIG. 12 is a schematic diagram of circuit components including a decode block for controlling operation of source drivers for a foveated display, according to an embodiment.

FIG. 12 illustrates a schematic diagram 150 of circuit components for a foveated display, according to an embodiment of the present disclosure. A decode block 152 may supply a first control signal to control operation of a first set of switches, such as switch 136 that determine which source driver(s) to connect to the display 18. In some embodiments, the decode block 152 may supply a first control signal based on a luminance level for a foveated area of the display 18. For example, the decode block 152 may supply a control signal to operate the switch 136 and connect the source driver 124 to the display 18 to drive one or more rows of pixels of the display 18. In some embodiments, the decode block 152 may supply a control signal 114 to control operation of a second set of switches 122 (e.g., switches 126, 128, 130, 132). The decode block 152 may decode image data in any suitable way. For example, the decode block 152 may supply a control signal 114 based on a logic table, such as Table 3 below:

TABLE 3

| Bit String | Source Driver Mode |
|---|---|
| 000 | 1x |
| 001 | 1x |
| 010 | 1x |
| 011 | 1x |
| 100 | 1x |
| 101 | n/a |
| 110 | 2x |
| 111 | 4x |

In certain embodiments, the decode block 152 may receive the control signal 114 and may control operation of the set of switches to determine which source driver(s) to connect to the display 18 based on the control signal 114. For example, the decode block 152 may determine at least one of the source drivers is defective and may bypass the defective source driver.

Figure 13:
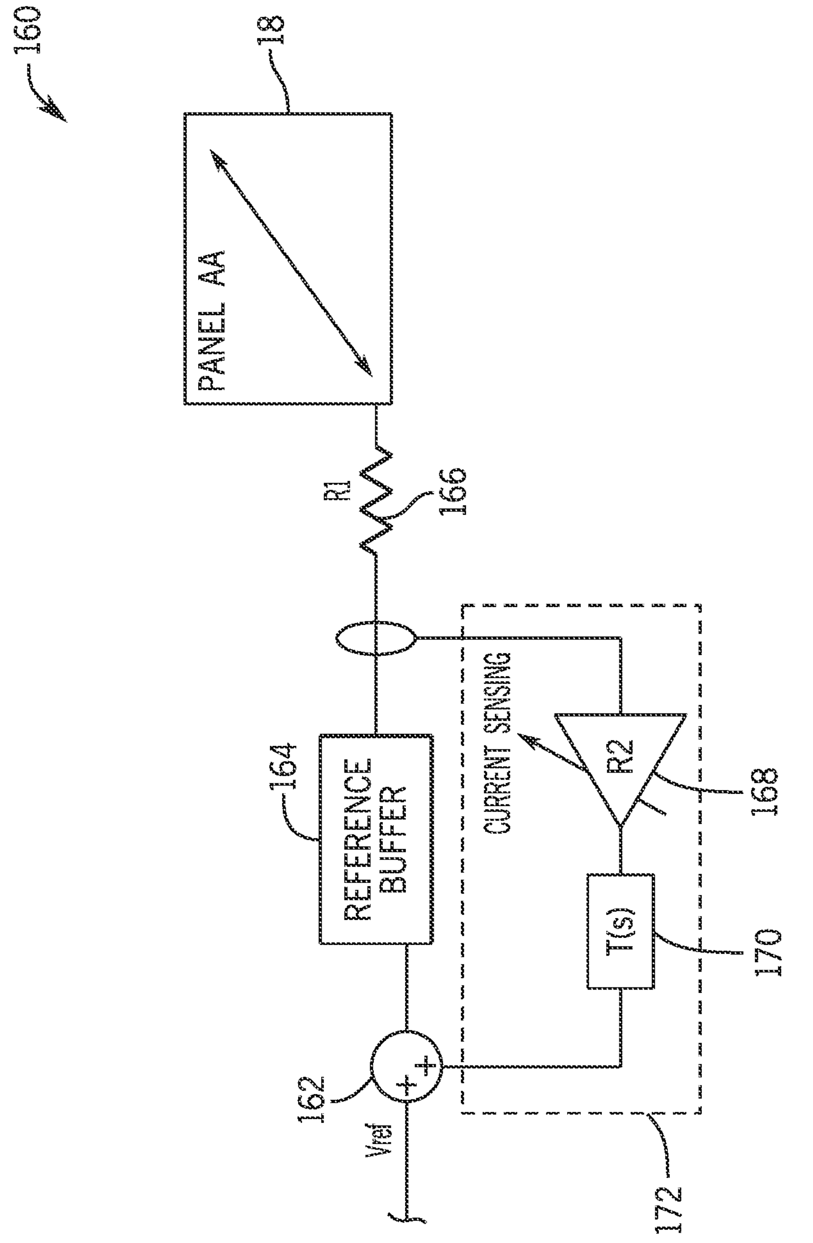
FIG. 13 is a schematic diagram of circuit components for compensating voltage for an electronic display using dynamic foveation, according to an embodiment.

FIG. 13 illustrates a schematic diagram of a sensing and compensation circuit 160 for compensating voltage for an electronic display using dynamic foveation, such as the electronic display 18 discussed above, according to an embodiment of the present disclosure. The sensing and compensation circuit 160 may be embodied on a source driver. The electronic display 18 may include a display panel having multiple display pixels arranged as an array or matrix defining multiple rows and columns. In some embodiments, the display panel may have a characteristic panel resistance. The sensing and compensation circuit 160 may determine the characteristic panel resistance for associated with a corresponding display panel. For example, the characteristic panel resistance may be measured after fabrication of the display panel. In certain embodiments, the sensing and compensation circuit 160 may include a routing resistance 166 associated with the components and transmission lines. The characteristic panel resistance and the routing resistance 166 may cause a voltage drop as the foveation system adjusts current supplied based on receiving an indication of movement of a gaze from an eye tracker. For example, the eye tracker may provide a direction of movement of the gaze. As a result of the voltage drop, the display pixels may display differing luminance levels and affect an experience of a user. The sensing and compensation circuit 160 may sense one or more parameters from the display panel, such as an emission current 174. For example, the sensing and compensation circuit 160 may include feedback circuit 172 including a current sensing component 168. In some embodiments, the sensing component 168 may be a resistor having an associated resistance and may be significantly similar to the routing resistance 166 of the sensing and compensation circuit 160. For example, the sensing component 168 may have a resistance within one percent, within one tenth of a percent, within one hundredth of a percent, within one thousandth of a percent, and so forth. In certain embodiments, the sensing component 168 may have a resistance significantly smaller than the routing resistance 166 of the sensing and compensation circuit 160. The sensing component 168 may supply a compensation voltage to a summer 162 where it is combined with a reference voltage output from a reference voltage source. The compensated reference voltage may be delivered to a reference buffer 164 for delivery to the display panel. Hence, the compensated reference voltage may reduce or eliminate the transient effects from the shifting current in response to the indication of movement.

In certain embodiments, the feedback circuit 172 may include a filter component 170. The filter component 170 may prevent the compensated reference voltage from changing too quickly in response to the compensation voltage. For example, the filter component 170 may include a one kilohertz filter and may filter out high frequency (e.g., above one kilohertz) spikes in the compensation voltage.

Figure 14:
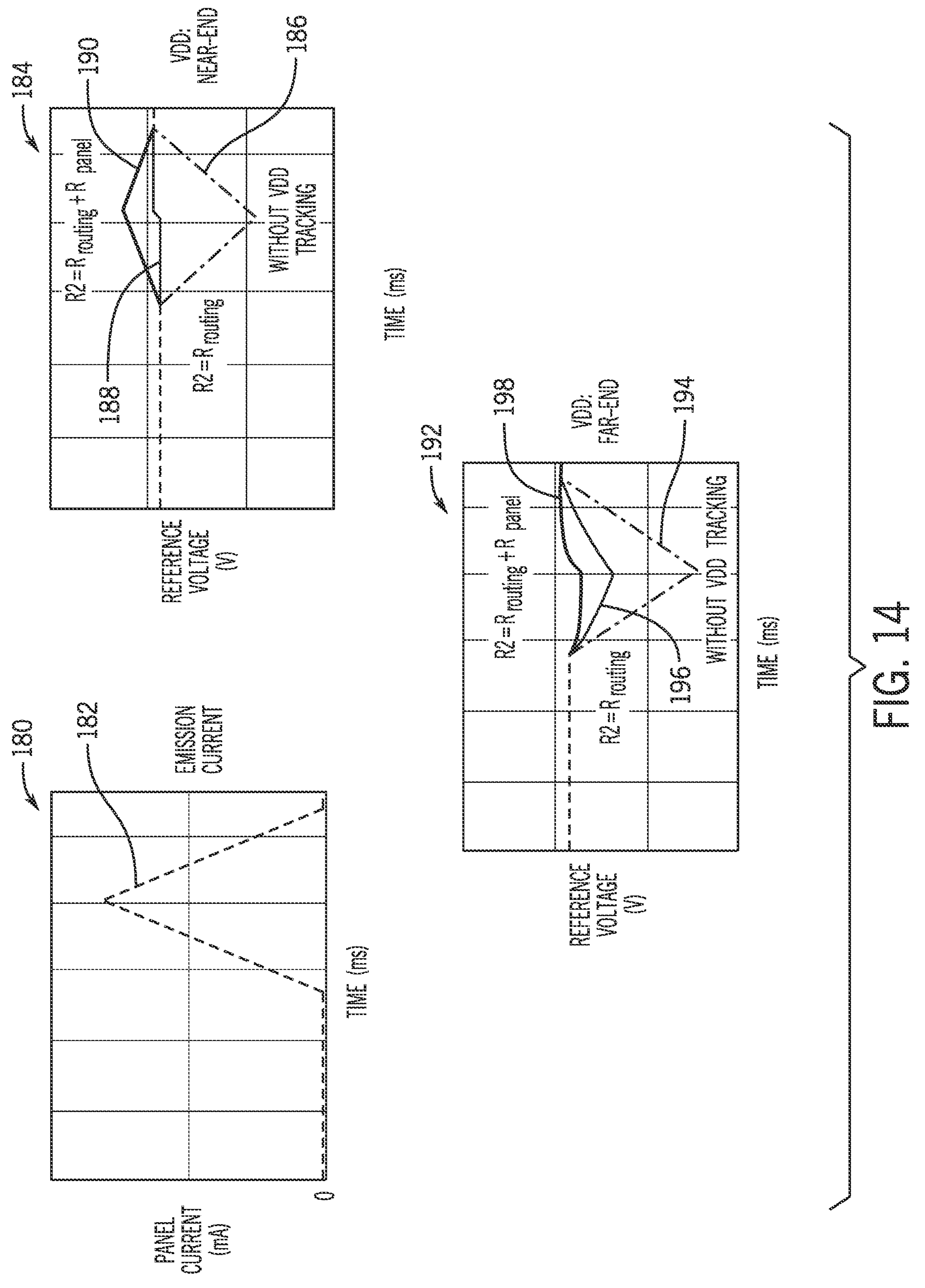
FIG. 14 is a set of graphs displaying a current and voltages for the circuit components of FIG. 13, according to an embodiment.

FIG. 14 illustrates a set of graphs of the sensing and compensation circuit 160 in FIG. 13, according to an embodiment of the present disclosure. In graph 180, a first line 182 indicates an emission current measured by the sensing and compensation circuit. The first line 182 may begin at time zero where the measured current is zero and may increase in response to the foveation system receiving an indication of movement associated with a gaze. The graph 184 corresponds to a near end area of the display panel. The graph 184 illustrates a line 186 indicating an uncompensated reference voltage corresponding to a display panel without the sensing and compensation circuit 160. As illustrated, the line 186 drops from a first voltage value (e.g., between two to five volts) to a second voltage value (e.g., between two to five volts) in response to the changing emission current depicted in graph 180. As such, artifacts may be visible or may be perceived by the user which negatively affect the experience of the user. The line 188 indicates a compensated reference voltage corresponding to a display panel with a sensing and compensation circuit 160 having a sensing component 168 resistance equal to the routing resistance 166. As shown, the line 188 stays relatively close to the initial value (e.g., within one percent, within one tenth of a percent, within one hundredth of a percent, and so forth) and differs from the initial value less than the uncompensated reference voltage in line 186 in response to the changing emission current depicted in graph 180. The line 190 indicates a compensated reference voltage corresponding to a display panel with a sensing and compensation circuit 160 having a sensing component 168 resistance equal to a sum of the routing resistance 166 and an associated resistance of the display panel (e.g., about 0.1 Ohms). As shown, the line 190 increases slightly above the initial value (e.g., between two to five volts) in response to the changing emission current depicted in graph 180. As such, the compensated reference voltage delivered to the display panel may reduce or may eliminate artifacts from being visible and deteriorating an experience of a user.

The graph 192 corresponds to a far end area of the display panel. The graph 192 illustrates a line 194 indicating an uncompensated reference voltage corresponding to a display panel without the sensing and compensation circuit 160. As illustrated, the line 194 drops from a first voltage value (e.g., between two to five volts) to a second voltage value (e . . . g, between two to five volts) in response to the changing emission current depicted in graph 180. As such, artifacts may be visible or may be perceived by the user which negatively affect the experience of the user. The line 196 indicates a compensated reference voltage corresponding to a display panel with a sensing and compensation circuit 160 having a sensing component 168 resistance equal to the routing resistance 166. As shown, the line 196 has a voltage drop (e.g., within one percent, within one tenth of a percent, within one hundredth of a percent, and so forth) and differs less than the uncompensated reference voltage in line 194 in response to the changing emission current depicted in graph 180. The line 198 indicates a compensated reference voltage corresponding to a display panel with a sensing and compensation circuit 160 having a sensing component 168 resistance equal to a sum of the routing resistance 166 and an associated resistance of the display panel. As shown, the line 198 stays relatively close to the initial value (e.g., within one percent, within one tenth of a percent, within one hundredth of a percent, and so forth) in response to the changing emission current depicted in graph 180. As such, the compensated reference voltage delivered to the display panel may reduce and/or may eliminate artifacts from being visible and deteriorating an experience of a user.

Figure 15:
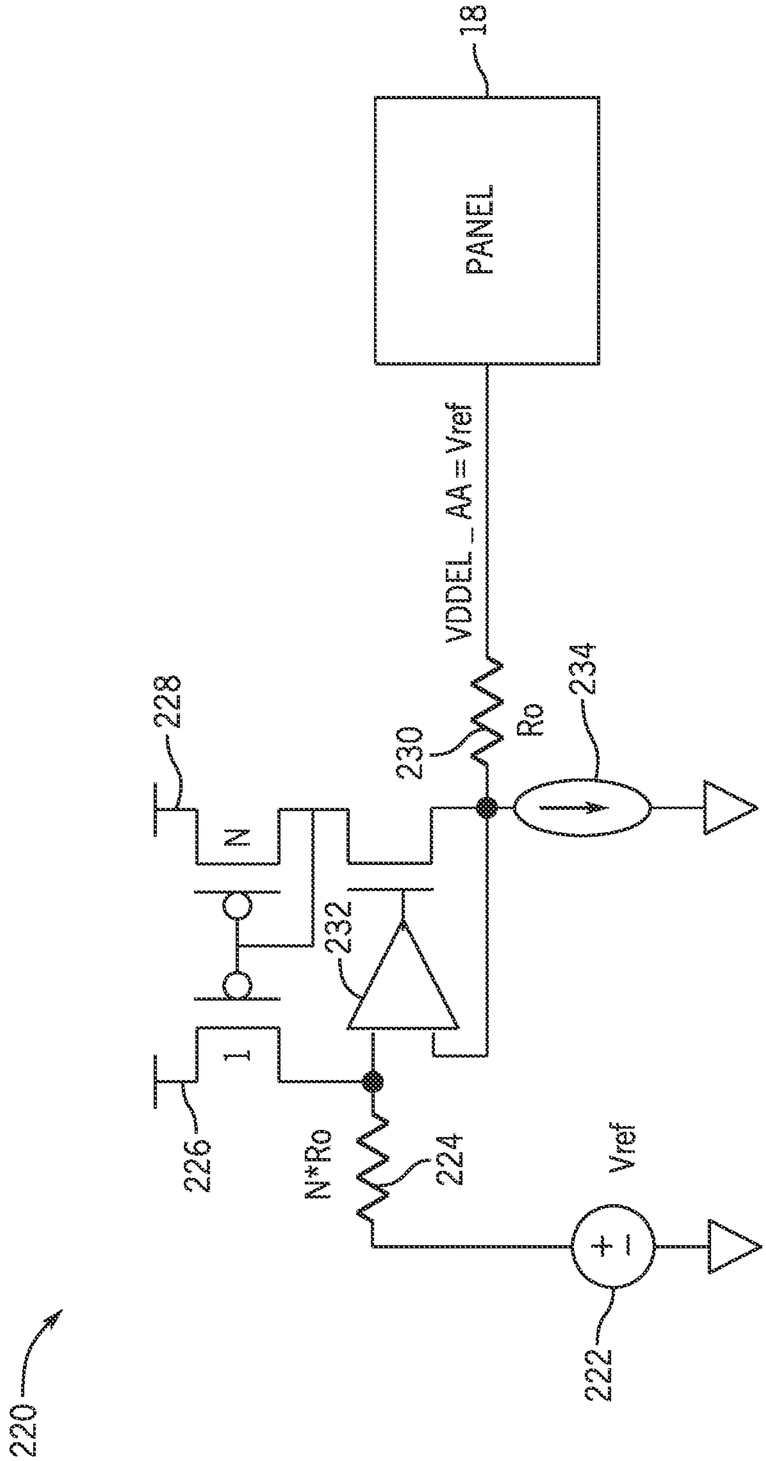
FIG. 15 is a schematic diagram of circuit components for supplying a voltage drop to an electronic display, according to an embodiment.

FIG. 15 is a schematic diagram 220 of circuit components for supplying a voltage drop to an electronic display, according to an embodiment. A voltage source 222 supplies a reference voltage, Vref, according to image data for displaying luminance levels at a display pixel of electronic display 18. A first resistor 224 may have a resistance of $N*R_o$, where N may be any suitable number, and a second resistor 230 may have a resistance of $R_o$. The voltage drop across the second resistor 230 may be equivalent to the reference voltage supplied by the voltage source 222. A first transistor 226 and a second transistor 228 may have a relationship of 1 to N based on a size of the first transistor 226 and the second transistor 228. A current source 234 may produce a constant load current for differing load resistances. An amplifier 232 may be supplied the reference voltage, Vref.

Figure 16:
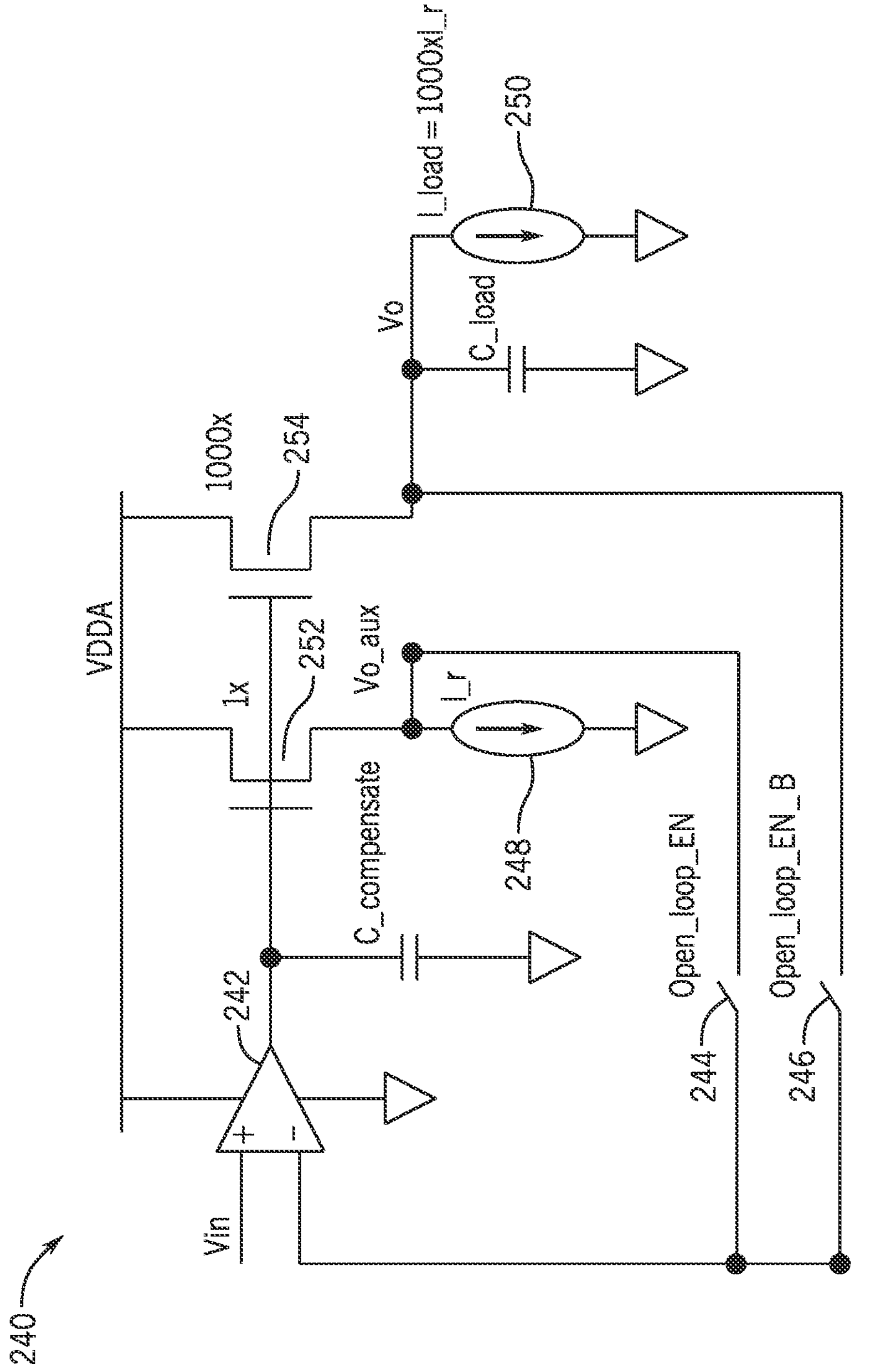
FIG. 16 is a schematic diagram of circuit components for reducing power consumption for an electronic display, according to an embodiment.

FIG. 16 is a schematic diagram 240 of circuit components for reducing power consumption when a load is off, according to an embodiment of the present disclosure. The schematic diagram 240 may include a first current source 248 and a second current source 250. In some embodiments, the second current source 250 may produce a load current greater than the first current source 248 (e.g., five hundred times greater, one thousand times greater, and so forth). A first transistor 252 may have a lower doping concentration level than a second transistor 254 (e.g., five hundred times smaller, one thousand times smaller, and so forth. In certain embodiments, the ratio of doping concentration levels between the first transistor 252 and the second transistor 254 may be equal to a ratio between the load current from the first current source 248 and the load current from the second current source 250. An input voltage, Vin, may be supplied to an amplifier 242. A first switch 244 and a second switch 246 may control feedback to the amplifier 242 based on an operational mode of an electronic display. For example, in normal operation when the electronic display is powered on, the first switch 244 may be open (as shown) and the second switch 246 may be closed. An output voltage, Vo, may be regulated by the feedback through the first switch 244 supplied to the amplifier 242. When the load is powered down or turned off, second switch 246 may be open (as shown) and first switch 244 may be closed.

As may be appreciated, though the current embodiments refer to movement of the foveated areas toward the center of the display, movement of the foveated area toward other portions of the display could be performed in other embodiments. For example, based upon contextual (e.g., saliency) information of the images displayed on the display, it may be more likely that the focus of the eyes of the user will be at another part of the display (e.g., a more salient area of the display). A salient area of the display may be considered an area of interest based at least in part on the image content. The focal point of the eyes of the user may be drawn to the salient area of the display based at least in part on the content.

When a likely focus area is known, it may be prudent to default movement of the foveated areas toward that portion of the display rather than the center of the display. Thus, in an example where the images displayed have dynamic movement only in the upper right corner (i.e., other portions of the images in the display are still—this may be referred to as "saliency by the effect of movement"), the likely focal area may be the area where dynamic movement is being rendered. Accordingly, in this example the movement of the foveated areas may be toward the upper right corner (i.e., toward the dynamic movement being rendered).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic display comprising:

a display panel configured to operate using a reference voltage received via a resistive path having a routing resistance;

a reference voltage source configured to output the reference voltage; and a feedback circuit configured to sense an electrical parameter of the resistive path and produce a compensation voltage that, when added to the reference voltage, causes the reference voltage to remain constant at the display panel.

2. The electronic display of claim 1, wherein the feedback circuit comprises a current sensor configured to detect an electrical current as the electrical parameter of the resistive path.

3. The electronic display of claim 2, wherein the current sensor comprises a resistor that matches the routing resistance.

4. The electronic display of claim 2, wherein the current sensor comprises a programmable resistor configured to be programmed to match the routing resistance.

5. The electronic display of claim 1, wherein the feedback circuit comprises a temporal filter to reduce transients in the compensation voltage.

6. The electronic display of claim 1, comprising an amplifier configured to receive a summation of the reference voltage and the compensation voltage to provide a power supply via the resistive path to the display panel to supply the reference voltage.

7. The electronic display of claim 1, comprising:

a first resistor coupled to the reference voltage source;

an amplifier comprising a first input, a second input, and an output, wherein the first resistor is coupled to the first input;

a plurality of transistors coupled to the first input and the output;

a second resistor coupled to the second input, a respective transistor of the plurality of transistors, and the display panel; and a current source coupled between the second resistor and a ground voltage terminal.

8. The electronic display of claim 1, comprising a processor core complex configured to:

detect that the display panel is disconnected from a power supply; and in response to detecting that the display panel is disconnected from the power supply, operate a plurality of circuit components into a power reduction mode configured to reduce power consumed by the display panel while disconnected from the power supply.

9. The electronic display of claim 8, wherein the plurality of circuit components operated in the power reduction mode comprise:

an amplifier comprising a positive input coupled to the reference voltage source;

a first switch operated into a first state; and a second switch operated into a second state opposite that of the first state, wherein the first switch is configured to couple a current source and a first transistor to a negative input of the amplifier at least in part causing an output voltage supplied to the display panel to be zero.

10. The electronic display of claim 9, wherein the first state corresponds to a closed switch state.

11. A system comprising:

a reference voltage source configured to output a reference voltage via a resistive path having a routing resistance;

a display panel configured to receive the reference voltage via the resistive path;

a feedback circuit configured to sense an electrical parameter of the resistive path and produce a compensation voltage that, when added to the reference voltage, causes the reference voltage to remain constant at the display panel; and a processor core complex configured to isolate the display panel from the reference voltage source while the display panel is powered off.

12. The system of claim 11, wherein the feedback circuit comprises:

a current sensor configured to detect an electrical current as the electrical parameter of the resistive path, wherein the current sensor comprises a programmable resistor configured to be programmed by the processor core complex to match the routing resistance.

13. The system of claim 12, comprising a reference buffer and a filter, wherein the resistive path comprises the reference buffer, wherein the current sensor comprises the filter coupled to the programmable resistor, and wherein the filter is coupled to a summer to provide a filtered output to be combined with the reference voltage provided to the display panel.

14. The system of claim 11, comprising:

a first resistor coupled to the reference voltage source;

an amplifier comprising a first input, a second input, and an output, wherein the first resistor is coupled to the first input;

a plurality of transistors coupled to the first input and the output;

a second resistor coupled to the second input, a respective transistor of the plurality of transistors, and the display panel; and a current source coupled between the second resistor and a ground voltage terminal.

15. The system of claim 11, comprising an amplifier comprising a positive input coupled to the reference voltage source; and a first switch and a second switch, wherein the first switch is configured to couple a current source and a first transistor to a negative input of the amplifier at least in part causing an output voltage supplied to the display panel to be zero, and wherein the processor core complex is configured to generate one or more control signals to close the first switch and open the second switch.

16. An electronic device, comprising:

a reference voltage source configured to output a reference voltage via a resistive path having a routing resistance;

a feedback circuit configured to sense, via a current sensor, an electrical signal associated with the resistive path and generate a compensation voltage based on the electrical signal; and a summer coupled to the resistive path, the reference voltage source, and a filter of the feedback circuit, wherein the summer is configured to combine the compensation voltage and the reference voltage to generate a constant voltage output configured to be delivered to a display panel.

17. The electronic device of claim 16, comprising:

the display panel configured to receive the constant voltage output via the resistive path from the summer;

a processor core complex configured to:

detect that the display panel is powered off; and operate a plurality of switches to isolate the display panel from the reference voltage source in response to the display panel being powered off.

18. The electronic device of claim 17, wherein the current sensor comprises a programmable resistor configured to be programmed by the processor core complex to match the routing resistance.

19. The electronic device of claim 16, wherein the current sensor is configured to have a resistance less than the routing resistance.

20. The electronic device of claim 16, comprising:

a first resistor coupled to the reference voltage source;

an amplifier comprising a first input, a second input, and an output, wherein the first resistor is coupled to the first input;

a plurality of transistors coupled to the first input and the output;

a second resistor coupled to the second input, a respective transistor of the plurality of transistors, and the display panel; and a current source coupled between the second resistor and a ground voltage terminal.

* * * * *